United States Patent Office 3,338,659
Patented Aug. 29, 1967

3,338,659
METHOD AND COMPOSITION FOR DYEING CERTAIN TEXTILE FIBERS WITH β - ARYLATED NAPHTHOXIDINES
Hans Bosshard, Basel, and Werner Bossard, Riehen, Switzerland, assignors to J. R. Geigy A.G., Basel, Switzerland
No Drawing. Filed Jan. 19, 1966, Ser. No. 521,492
Claims priority, application Switzerland, Nov. 15, 1961, 13,244/61
13 Claims. (Cl. 8—39)

ABSTRACT OF THE DISCLOSURE

Cellulose di- to tri-acetate fibers and fibers of polymerizates of alkylene glycol arylene dicarboxylic acid esters are dyed with β-arylated naphthoxidines in shades of good fastness properties. Storable compositions containing said β-arylated naphthoxidines are provided.

This is a continuation-in-part application of our copending applications Ser. Nos. 327,100, filed Nov. 29, 1963 now abandoned, and 440,918, filed Mar. 18, 1965, which are in turn continuation-in-part of our patent applications Ser. Nos. 237,755 and 237,760, both filed Nov. 14, 1962, the latter now being abandoned.

The present invention concerns a new use of new naphthoxidines which are arylated at the central naphthalene ring, new compositions containing as a coloring ingredient naphthoxidines of the last-mentioned type for the dyeing of textile, and particularly of hydrophobic polyester fibers and foils. It also concerns the hydrophobic textile materials dyed with the new arylated naphthoxidines.

In the following portion of this specification, which relates to said second aspect, reference in any example to a preceding example means the designated preceding example of this second aspect-portion of the specification.

It is one of the problems in the dyeing of fibers and foils of polyesters, which comprise as used in this specification and in the appended claims, cellulose di- and triacetate as well as polyesters in the narrower sense, namely, glycol esters of arylene dicarboxylic acids, especially of the poly-hydroxyethyl terephthlate type, to find dyestuffs which dye these materials with satisfactory drawing power in shades which are fast to light and of at least satisfactory fastness to sublimation; preferably such dyeings on polyester fibers and foils should also be fast to alkali, to wet treatment, to sea water and gas fumes.

The method of dyeing the said polyester materials according to the invention, comprises dyeing of said materials preferably from an aqueous dispersion, with dyestuffs which fall under one of the formulas

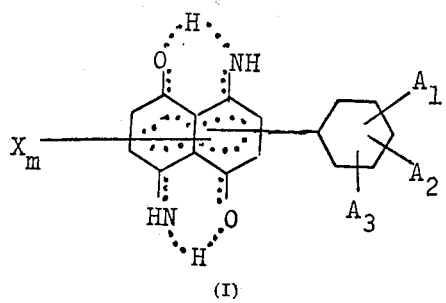

(I)

wherein $A_1$ represents nitro, fluorinated lower alkyl, alkoxy-carbonyl of a total of from 2 to 8 carbon atoms, alkoxy-alkoxycarbonyl of a total of from 3 to 8 carbon atoms, cyclohexyloxy-carbonyl, benzyloxy-carbonyl, lower alkyl-benzyloxy-carbonyl, chlorobenzyloxy-carbonyl, bromobenzyloxy-carbonyl, nitro - benzyloxy - carbonyl, lower alkyl-sulfonyl, N,N-di-(lower alkyl)-sulfamyl, phenylcarbonyl, N,N-di-(lower alkyl)-carbamyl, N-phenyl-N-lower alkyl-carbamyl or lower alkanoyl, $A_2$ represents hydrogen, chloro, bromo, fluoro, alkyl of 1 to 5 carbon atoms, or trifluoromethyl;

$A_3$ represents hydrogen, chloro, bromo, fluoro and alkyl of 1 to 5 carbon atoms;

X represents a member of hydrogen, halogen with an atomic weight of maximally eighty, m is an integer ranging from 0 to 3 whereby dyeings are obtained which are distinguished by excellent light fastness as well as satisfactory fastness to sublimation.

It is particularly unexpected that those substituents at the phenyl substituent which lead to satisfactory dyeings with naphthoxidines which bear phenyl substituents at one or both imino groups of the naphthoxidine nucleus, for example, the alkoxy substituent in the known compound of the formula

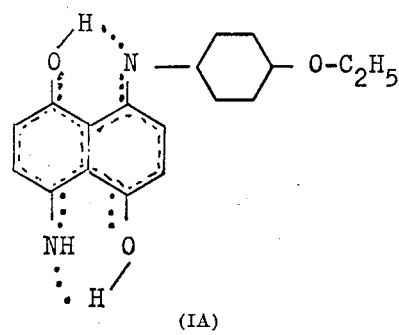

(IA)

or, also, alkoxy-alkoxy, alkoxy-alkoxy-alkoxy or phenylazo and the like substituents, which are preferred in order to obtain polyester dyeings fast to light and sublimation, fail in this respect when present on a benzene nucleus directly substituted in β-position on the naphthalene nucleus of the naphthoxidine molecule. Naphthoxidines ring-substituted by phenyl fail in drawing power, fastness to light and/or fastness to sublimation when they are unsubstituted or bear one of the last-mentioned substituents of the known N-phenyl naphthoxidines.

Similarly good dyeings on polyester as are obtained with dyestuffs of Formula I are also obtained with dyestuffs of the following formula

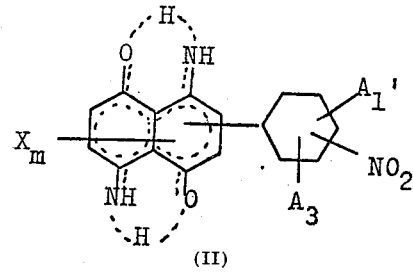

(II)

wherein $A_1'$ represents fluorinated lower alkyl, alkoxycarbonyl of a total of from 1 to 8 carbon atoms, alkoxyalkoxycarbonyl of a total of from 1 to 8 carbon atoms, cyclohexyloxy-carbonyl, benzyloxy-carbonyl, methyl-lower alkyl-benzyloxycarbonyl, chlorobenzyloxy-carbonyl, bromobenzyloxy-carbonyl, nitrobenzyloxy-carbonyl, lower alkyl-sulfonyl, N,N-di-(lower alkyl)-sulfamyl, phenylcarbonyl, N,N-di-(lower alkyl)-carbamyl, N-phenyl-N-lower alkyl-carbamyl or lower alkanoyl, and m, $A_3$ and X have the meanings given hereinbefore.

Dyeings with these compounds are characterized, depending on the nature of the dyed textile material, by good drawing power, and fastness to light, to sublimation, to alkali, to wet treatment, to sea water, and to gas fumes.

Polyester fibers are dyed with aqueous dispersions of dyestuffs according to the invention, advantageously at temperatures of over 100° under pressure. Dyeing can also be performed, however, at the boiling point of the water in the presence of color carriers such as phenylphenol, polychlorobenzene compounds or similar auxiliaries.

Cellulose acetate materials which can be dyed by the method according to the invention with the new naphthoxidine dyestuffs by the method of Formulas I and II, and those of Formulas III to V described hereinafter, are cellulose diacetate and cellulose triacetate fibers and foils; suitable polyester materials for the purposes of the instant invention are, e.g. polymerizates of alkylene-glycol arylene dicarboxylic acid esters, especially diethylene-glycol terephthalate and hexahydro xylylenediol terephthalate (Terylene, Dacron, Tergal, Trevira, Kodel), suitable polyamide materials are, for instance, hexamethylene adipate polymerizate fibers (nylon), and ε-caprolactam polymerizate fibers (Perlon).

The new dyestuffs used in the new method according to the invention are further characterized by an excellent reserve for cotton. They are, therefore, particularly suited for the dyeing of fiber blends of cotton and other textile materials to which the aryl-naphthoxidine dyes of Formulas I to V have good affinity.

Those compounds of the above Formula I, in which $R_1$ is

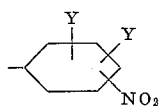

wherein each Y is independently either hydrogen or a halogen atom of an atomic weight of maximally 80, are dyestuffs of very good drawing power on polyester and cellulose acetate, of good sublimation, of pure blue shades, their wet fastness including fastness to alkali, water, perspiration. Of particular importance are the latter fastness for dyeings on cellulose di- and triacetate, and the fastness to light, and the fastness to sublimation at temperatures of 160–180° C., for dyeings on polyester fibers, obtained with the last-mentioned group of compounds according to the invention.

The compounds which fall under Formula I and are of the formula (III)

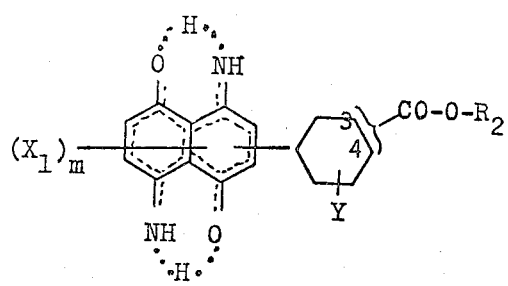

wherein $m$ is an integer ranging from 0 to 3,
X is either hydrogen, chlorine or, preferably, bromine,
$R_2$ is either alkyl with maximally 7 carbon atoms, or cyclohexyl, benzyl, methylbenzyl, chlorobenzyl, bromobenzyl or nitrobenzyl, and
Y is hydrogen or nitro,
are dyestuffs of similar properties as the last-mentioned class, but afford polyester dyeings of even better fastness to sublimation. Optimal results are obtained with the dyestuffs of Formula III in which Y is nitro in 4-position and the ester radical is in 3-position. Blue to green-blue shades are obtained by using these dyestuffs on cellulose acetate and polyester fibers.

The compounds of the formula (IV)

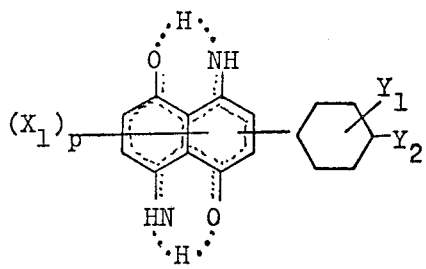

wherein $p$ is an integer ranging from 1 to 2,
$X_1$ represents either a chlorine or, preferably, a bromine atom,
$Y_1$ represents from one to two chlorine, bromine or hydrogen atoms, and
$Y_2$ represents chlorine, bromine or preferably nitro, are dyestuffs which have good drawing power on polyglycol terephthalate and other polyester fibers, good fastness to light and sublimation, and fastness to gas fumes, in which latter fastness those excel in which $Y_1$ represents two chlorine atoms, and $Y_2$ is also chlorine, i.e. those having three chlorine atoms as substituents of the benzene nucleus.

This group of dyestuffs is further distinguished by their stability in dyeing processes requiring dyeing baths at temperatures above 100° C.

Among the β-arylated naphthoxidines of Formula IV, those of the formula (V)

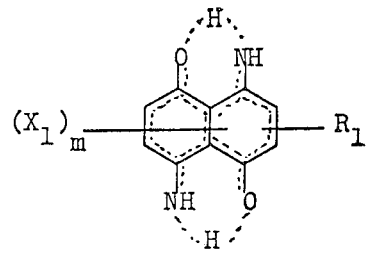

wherein $m$ is an integer ranging from 0 to 3,
$X_1$ is either chlorine, or, preferably, bromine,
$R_1$ is phenyl substituted with from 2 to 5 halogen atoms, and preferably with 2 to 3 halogen atoms, each halogen atom having an atomic weight of maximally 80 (i.e. an atomic number ranging from 9 to 35) have good drawing power on polyester including cellulose acetate fibers, good fastness to light, of pure blue shades, good wet fastness, and good resistance to burnt gas fumes.

The new, valuable arylated naphthoxidines used in the method according to the invention, and others are obtained by reacting compounds of the formula

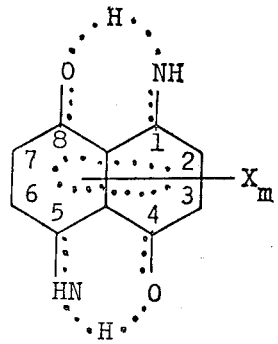

(VI)

(X being a substituent as defined above and $m$ being an integer from 0 to 3 inclusive)

with aromatic diazonium compounds, the resulting novel compounds, derivatives of the compounds of Formula VI are resonance hybrids, of which Formula VI covers the limit electron configurations, as described by Ernest Merian in "Chemie der Aminonaphthochinone" (Chemia, 13, pages 181–212 (1959)), and are herein referred to, for the sake of brevity, as "naphthoxidines."

Naphthoxidines which are usable as starting materials in the last-mentioned process can be further substituted at the naphthalene nucleus in the 2-, 3-, 6- or 7-position and at the nitrogen atoms linked to the 1- and/or 5-position. Halogen atoms and/or lower alkyl groups such as chlorine or, preferably, bromine, lower alkyl groups such as methyl, ethyl, n-propyl, isopropyl groups, can be present as substituents of the naphthalene nucleus.

The substitution of a free hydrogen atom, bound to the naphthalene nucleus of naphthoxidine, by the radicals of a diazonium salt with cleavage of the nitrogen of the

group of the latter is very unexpected, for naphthalene derivatives such as 1-hydroxy-4-amino-naphthalene couple with diazonium salts with formation of an azo bridge

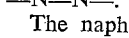

The naphthoxidines used as starting materials in the said process fail to show the typical quinone reaction of, for instance, benzo- or naphthoquinone. Furthermore, the known arylated benzo- or naphthoquinones are relatively unstable due to their pronounced quinone character and are unsuited for use as dyestuffs.

Ring substituted arylated iminobenzoquinones and iminonaphthoquinones have never been produced prior to the present invention, to the best of our knowledge.

Aromatic diazonium compounds which are suitable as reactants in the process for making the compounds used according to the present invention are those of carbocyclic as well as those of heterocyclic, mono- or bicyclic radicals which retain their aromatic character even in strongly acid solutions, and are of the formula

wherein $X^-$ is a suitable anion such as $Cl^-$, $NO_3^-$, $SO_4^{--}$, $HCOO^-$ and the like. The nature of the anion is not critical, one of the substituted phenyl radicals defined hereinbefore in Formulas I to V.

The naphthoxidines which may be substituted as defined above, and which are suitable for use in the process for making the compounds to be used according to the invention, are known or can be obtained by methods known per se, for example, from 1,5-dinitronaphthalenes substituted in the 2-, 3-, 6- or 7-position, by partial reduction with sulfur sesquioxide.

In this reaction, from one to two moles, or even an excess over the latter amount, but preferably one mole of diazonium compound is caused to react with one mole of the starting naphthoxidine at a temperature within the range of $-15°$ and $50°$ C., whereby an equivalent amount of nitrogen is split off and the aromatic radical corresponding to the diazonium compound enters at a free $\beta$-position of the naphthalene nucleus.

More than one, and preferably two diazonium salt radicals R can be introduced into the naphthalene nucleus of the starting naphthoxidines, if the radical R is an active, strongly negatively substituted R and also R with two to five of the halogen substituents of I(a) supra.

Compounds used according to the invention having a further substituted naphthalene radical can be obtained by converting by reduction and/or oxidation, $\beta$-substituted, in particular halogenated naphthalene compounds having suitable substituents in at least two $\beta$-positions, into naphthoxidines and then reacting these with diazonium compounds. However, unsubstituted naphthoxidines can also be treated by known methods with electrophilically substituting agents and then reacted with aryl diazonium compounds. Finally, the novel naphthoxidines arylated at the naphthalene nucleus by reaction with diazonium compounds can also be modified for example, can be electrophilically substituted and, particularly, halogenated at the naphthalene nucleus; they can also be hydrolyzed at the nitrogen atom.

The conditions for the reaction producing the compounds which are useful according to the invention can be modified within wide margins. Both water or aqueous mineral acid as well as inert organic solvents, preferably those having high solubilizing properties such as dioxan or dimethyl formamide can be used as reaction media. The naphthoxidines can be reacted both in their free form as well as in the form of a metal halide, e.g. metal chloride adduct. Zinc halide adducts, for example the easily isolated zinc chloride double salt of naphthoxidine can be used in an organic solvent; in the preferred method, the aqueous sulfuric acid solution or suspension of the naphthoxidine is used which results from the production of the "naphthazarine intermediate product" (see Merian supra) in the usual way from 1,5-dinitronaphthalene.

The temperature and duration of the reaction depend to a considerable extent on the nature of the diazonium compound used. Generally, active electrophilically substituted diazonium compounds react considerably more quickly than the less active nucleophilically substituted aryl diazonium compounds. As mentioned above, the reaction takes place in a temperature range between $-15°$ and $50°$ C. and higher, but without causing hydrolysis of the desired end products and/or materials. The preferred temperature range is from $-5°$ to $+25°$ C. and even $+30°$ C. and the average duration of the reaction is about 6 to 24 hours. The reaction medium can be strongly acid to weakly alkaline; an acid medium of a pH smaller than 2 is preferred because of its more general applicability to all starting naphthoxidines. In a commercially preferred mode the reaction medium should contain at least about 20% by weight of water. It is also possible, in certain cases, to add the diazonium salt which has been isolated by filtration and optionally dried, to the naphthoxidine starting compound which has been at least partly dissolved in water or in a suitable, inert organic solvent.

The diazonium salt may also be added to the, preferably aqueous, naphthoxidine solution or suspension, in the form of the acid aqueous diazotization solution in which the diazonium salt has been produced "in situ."

The reaction products are isolated in the usual way and are purified if necessary by recrystallization or chromatographic adsorption. Further substitution, for example by halogenation or hydrolysis, is performed by known methods.

The aryl naphthoxidines according to the invention are black-blue to green-black glittering crystalline substance which, in a finely distributed suitable preparation with dispersing agents, dye cellulose acetate, wool, synthetic polyamides or polyesters, either without or after an optional further treatment, e.g. halogenation, in violet, blue to green shades.

Storable compositions for the preparation of aqueous dispersion for the disperse dyeing of polyester fibers and foils, consist (a) of dyestuffs which are defined in Formulas I–V and (b) at least about 20% by weight, of a dispersant which is either naphthalene sulfonic acid-formaldehyde condensation product or lignin sulfonate or a mixture of both.

The aforesaid naphthalene sulfonic acid-formaldehyde condensation products are produced from naphthalene sulfonic acid and formaldehyde in a weight ratio of about 10:1 to 14:1 under conventional condensation conditions. Mixtures of these condensation products with lignin sulfonate can be of random proportions. An anion-active wetting agent such as hydrophilic higher alkylbenzene sulfonates wherein alkyl is of about 10 to 18 carbon atoms, can be added in amounts of about 0.1 to 10% calculated on the total weight of the storable composition.

The following, non-limitative, examples further illustrate the invention. Parts are given therein as parts by weight and the temperatures are in degrees centigrade.

Example 1

21.8 parts of 1,5-dinitronaphthalene are reduced in the known manner with sulfur sequioxide in sulfuric acid to naphthoxidine. The sulfur which precipitates is removed from the solution of the reduction product in sulfuric acid by filtration. The filtrate is then slowly poured into water and ice while stirring well.

The aqueous hydrochloric acid solution of the diazonium compound resulting from diazotization of 17.8 parts of 2,4-dichloro-aniline is added dropwise within about 30 minutes to the blue-violet solution or suspension of naphthoxidine obtained as described above. Foaming ensues and nitrogen is split off. The reaction is completed in about 16 hours at 25°. The precipitated crude product is filtered off under suction, washed with water and, to purify the same, it is stirred into about 1000 parts of water and sodium hydroxide solution is added until the pH is about 12 to 13. The suspension is stirred for 2 hours at room temperature and then the precipitate is filtered off. After washing the blue-black residue with water, it is dissolved in 500 parts of boiling ethanol and any undissolved impurities are filtered off from the solution. The alcoholic solution is evaporated to dryness. A glittering, blue-black crystalline powder is obtained which melts at 208–210° on decomposition. In ethanol it dissolves with an intensive pure reddish-blue color. Its composition corresponds to the formula

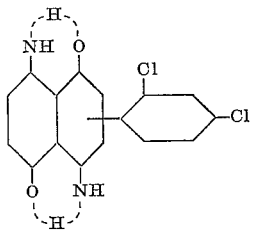

In aqueous dispersion, the substance dyes cellulose di- and tri-acetate and also polyester fibers in reddish-blue shades which have very good wet and light fastness properties.

By using, in the above example, the diazonium compounds from the amines given in the following Table I, which amines are used in amounts which are equimolar to the amine used in the example and otherwise following the same procedure, then correspondingly substituted derivatives are obtained which have similar properties.

TABLE I

| Example No. | Amine | Shade of dyeing with corresponding aryl compound on cellulose diacetate |
|---|---|---|
| 2 | 1-amino-3,4-dichlorobenzene | Greenish-blue. |
| 3 | 1-amino-2,5-dichlorobenzene | Do. |
| 4 | 3-aminobenzene-1-N,N-diethyl-sulfonyl | Do. |
| 5 | 4-aminobenzene methylsulfone | Reddish-blue. |
| 6 | 4-aminobenzoic acid ethyl ester | Greenish-blue. |
| 7 | 1-amino-4-nitrobenzene | Greenish-blue. |
| 8 | 1-amino-3-nitrobenzene | Reddish-blue. |
| 9 | 1-amino-2-nitrobenzene | Do. |
| 10 | 1-amino-2,5-dimethyl-4-nitrobenzene | Blue. |
| 11 | 1-amino-2-chloro-4-nitrobenzene | Greenish-blue. |
| 12 | 1-amino-2-bromo-4-nitrobenzene | Do. |
| 13 | 1-amino-4-chloro-2-nitrobenzene | Do. |
| 14 | 1-amino-2-4-dibromobenzene | Reddish-blue. |
| 15 | 1-amino-2,4-difluorobenzene | Do. |
| 16 | 1-aminophenyl-4-methylketone | Greenish-blue. |
| 17 | 4-amino-diphenylketone | Reddish-blue. |

Example 18

21.8 parts of 1,5-dinitronaphthalene are reduced in sulfuric acid with sulfur sesquioxide to naphthoxidine and the solution is diluted with ice water as described in Example 1.

A solution of the diazonium sulfate from 21.6 parts of 2,4,5-trichloro-1-aminobenzene is added dropwise, within about 1 hour while stirring, to the ice cold sulfuric acid aqueous solution of the naphthoxidine. After stirring for 18 hours at 10 to 15° the crude product, which has formed with development of nitrogen, is filtered off and purified as described in Example 1. A blue-black glittering product which dissolved in ethanol with a pure greenish-blue color is obtained. It is obtained in pure form by chromatographic adsorption when it then melts at 196–198° on decomposition.

Elementary analysis corresponds to the formula

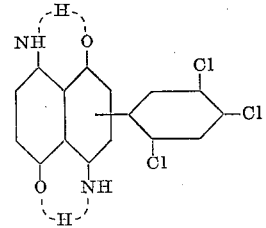

Found: C, 52.25%; H, 2.46%; Cl, 28.96%; N, 7.63%.
Calculated: C, 52.21%; H, 2.36%; Cl, 28.94%; N, 7.44%.

Dispersed in water in the usual way, the dyestuff produces pure greenish-blue dyeings on acetate silk or polyester fibers. The dyeings are fast to wet and light. The drawing power of the dyestuff is remarkably good.

If, in the above example, instead of the diazonium compound from 21.6 parts of 2,4,5-trichloro-1-aminobenzene, diazonium compounds from corresponding amounts of the amines given in the following Table II are used, and otherwise the same procedure is followed, then blue dyestuffs having similar properties are obtained.

TABLE II

| Example No. | Amine | Shade of dyeing with corresponding aryl compound on cellulose diacetate |
|---|---|---|
| 19 | 1-amino-2,3,4-trichlorobenzene | Greenish-blue. |
| 20 | 1-amino-3,4,5-trichlorobenzene | Do. |
| 21 | 1-amino-2,3,4,6-tetrachlorobenzene | Do. |
| 22 | Amino-pentachlorobenzene | Do. |
| 23 | 1-amino-4-chloro-3-trifluoromethyl benzene | Do. |
| 24 | 1-amino-2,5-dichloro-4-nitrobenzene | Do. |
| 25 | 1-amino-2,6-dibromo-4-nitrobenzene | Do. |
| 26 | 1-amino-2,6-dichloro-4-nitrobenzene | Do. |
| 27 | 1-amino-2,4,5-tribromobenzene | Do. |

Example 28

21.8 parts of 1,5-dinitronaphthalene are reduced to naphthoxidine in the usual way with sulfur sesquioxide in 185 parts of sulfuric acid. Excess sulfur is removed by filtration of the sulfuric acid solution of the reaction product and the filtrate is diluted with 300 parts of ice while cooling. A diazonium sulfate solution, obtained by diazotisation of 20 parts of 2-nitro-5-aminobenzoic acid-n-butyl ester, dissolved in 90 parts of concentrated sulfuric acid while cooling, is added dropwise to this dilute solution of the naphthoxidine at a temperature of 15 to 20° within about 4 hours. After stirring for another 3 hours, during which time the nitrogen development decreases, the reaction mass is diluted with 1500 parts of ice and water. The precipitated crude product is filtered off, washed with water, dilute sodium carbonate solution and again with water and dried. A difficultly soluble, black impurity is removed by extraction with 500 parts of boiling ethanol.

A blue-black glittering dyestuff is obtained which dissolves in ethanol with an intensively pure blue color. It is obtained in pure form by recrystallization or chromatographic adsorption on aluminum oxide, and it corresponds to the formula

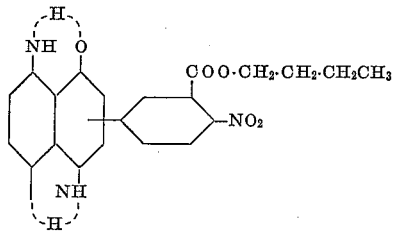

It dyes cellulose acetate and polyester fibers from a suitable aqueous dispersion in pure blue shades which have good fastness properties, in particular very good fastness to sublimation on polyester material.

If in the process described in the above example, a mixture of 200 parts of glacial acetic acid and 70 parts of concentrated hydrochloric acid is used for the diazotisation instead of the 90 parts of sulphuric acid, then a somewhat higher yield of the same dyestuff is obtained.

If in the above example, with otherwise the same procedure, the diazonium compounds from equimolecular amounts of the amines given in the following Table III are used, then correspondingly substituted derivatives having similar properties are obtained.

TABLE III

| No. | Amine | Shade of dyeing of corresponding aryl compound on polyester fibers |
|---|---|---|
| 1 | 2-nitro-5-amino-benzoic acid methyl ester | Greenish-blue. |
| 2 | 2-nitro-5-amino-benzoic acid ethyl ester | Do. |
| 3 | 2-nitro-5-amino-benzoic acid isopropyl ester | Do. |
| 4 | 2-nitro-5-amino-benzoic acid n-amyl ester | Do. |
| 5 | 2-nitro-5-amino-benzoic acid cyclohexyl ester | Do. |
| 6 | 2-nitro-5-amino-benzoic acid ethoxyethyl ester | Do. |
| 7 | 1-amino-2-chloro-4-nitro-benzene | Do. |
| 8 | 1-amino-2-bromo-4-nitro-benzene | Do. |
| 9 | 1-amino-4-bromo-3-nitro-benzene | Do. |
| 10 | 1-amino-2,5-dichloro-4-nitro-benzene | Do. |
| 11 | 4-amino-3-nitrobenzene sulfonic acid diethylamide | Do. |
| 12 | 1-amino-2,4,5-trichlorobenzene | Blue. |
| 13 | 1-amino-2,3,4-trichlorobenzene | Do. |
| 14 | 1-amino-4-chloro-3-trifluoromethyl-benzene | Greenish-blue. |
| 15 | 2-nitro-5-amino-benzoic acid-benzyl ester | Do. |
| 16 | 2-nitro-5-amino-benzoic acid-2-methyl-benzyl ester | Do. |
| 17 | 2-nitro-5-amino-benzoic acid-4-chloro-benzyl ester | Do. |
| 18 | 2-nitro-5-amino-benzoic acid-4-bromo-benzyl ester | Do. |
| 19 | 2-nitro-5-amino-benzoic acid-4-nitrobenzyl ester | Do. |
| 20 | 4-aminobenzene-sulfonic acid-mono-ethylamide | Do. |

*Example 29*

10.4 parts of dibromo naphthoxidine, obtained as described in German Patent No. 841,314, are dissolved in 200 parts of dimethyl formamide. The diazonium chloride solution from 4.94 parts of 4-nitroaniline is added dropwise to the solution within 1 hour at a temperature between 0 and 10°. Nitrogen is developed. After stirring for 6 hours at 5 to 10°, the solution is diluted with water, the product which precipitates is filtered off and washed. It is purified by recrystallization from ethanol. In polar organic solvents the reaction product dissolves with a green-blue color; the color is considerably more green than that of the starting material. As dispersion dyestuff, the new compound dyes synthetic fibers such as cellulose acetate or polyester fibers in very pure green-blue shades of good color strength.

Similar dyestuffs are obtained if, in the above example, the reaction components are replaced by equivalent amounts of the starting materials given in the following Table IV.

TABLE IV

| No. | Naphthoxidine component | Amine for diazonium component | Arylated product shade of dyeing on polyester |
|---|---|---|---|
| 1 | 3,7-dibromo-naphthoxidine. | 1-amino-2,4-dichloro-benzene. | Greenish-blue. |
| 2 | do | 1-amino-2,4-dibromo-benzene. | Do. |
| 3 | do | 1-amino-2,4,5-tri-chlorobenzene. | Do. |
| 4 | do | 1-amino-2-chloro-4-nitrobenzene. | Green-blue. |
| 5 | do | 1-amino-2,5-dichloro-4-nitrobenzene. | Do. |
| 6 | 3-bromo-naphthoxidine. | 1-amino-2-chloro-4-nitrobenzene. | Greenish-blue. |
| 7 | 2-chloro-naphthoxidine. | 1-amino-4-nitro-benzene. | Do. |
| 8 | 2,6-dichloro-naphthoxidine. | 1-amino-2,4,5-tri-chlorobenzene. | Green-blue. |
| 9 | 3,7-dibromo-naphthoxidine. | 1-amino-2-bromo-4-nitrobenzene. | Do. |
| 10 | do | 3-amino-6-nitroben-zoic acid-n-butyles-ter. | Do. |

*Example 30*

26.8 parts of the end product obtained according to Example 1 are dissolved in 300 parts of chloroform and 15.2 parts of bromine are added. The reaction mixture is refluxed for 2 hours. The solution obtained is washed neutral with water and the chloroform is distilled off.

The brominated dyestuff, which is obtained in a pure form in the usual way, e.g. by recrystallizing or adsorption on an aluminum oxide column; corresponds to the formula

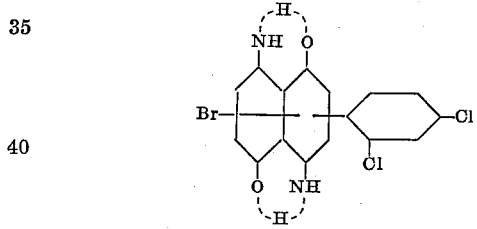

From a suitable aqueous dispersion, it dyes cellulose acetate and polyester fibers in pure blue shades which have very good fastness properties. It has good drawing power.

If in the above example, instead of the 26.8 parts of end product according to Example 1, equivalent amounts of the arylated naphthoxidine in the following Table VI are used, then dyestuffs having similar properties are obtained.

TABLE VI

| No. | Starting material to be brominated | Brominated product shade of dyeing on cellulose diacetate |
|---|---|---|
| 1 | 2,4-difluorophenyl- | Reddish blue. |
| 2 | 2,5-dichlorophenyl- | Do. |
| 3 | 3,4-dichlorophenyl- | Greenish blue. |
| 4 | 2,4,5-trichlorophenyl- | Do. |
| 5 | 3,4,5-trichlorophenyl- | Do. |
| 6 | 2,4-dibromophenyl- | Reddish blue. |
| 7 | 2,5-dibromophenyl- | Do. |
| 8 | 4-nitrophenyl- | Greenish blue. |
| 9 | 2-chloro-4-nitrophenyl- | Do. |
| 10 | 4-chloro-2-nitrophenyl- | Do. |
| 11 | 2,5-dichloro-4-nitrophenyl- | Do. |
| 12 | 2,6-dibromo-4-nitrophenyl- | Do. |
| 13 | 4-carboethoxyphenyl- | Reddish blue. |
| 14 | 2-bromo-4-nitrophenyl- | Blue-green. |

Example 31

If the procedure given in Example 30 is followed but instead of 15.2 parts, 30.4 parts of bromine are used, then dyestuffs having similar properties and a somewhat more green shade are obtained. Their composition corresponds to the formula:

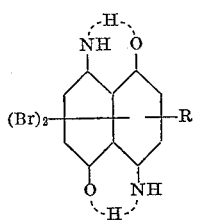

Chlorine-containing blue dyestuffs are obtained by the above method if the bromine is replaced by the equivalent amount of sulfuryl chloride.

Example 32

2 parts of the dyestuff produced according to Example 12 are dispersed in 4000 parts of water. 12 parts of the sodium salt of o-phenylphenol and 12 parts of diammonium phosphate are added to this dispersion. 100 parts of terephthalic acid polyglycol ester yarn are dyed for 1½ hours at 95–98°. The dyeing is rinsed and after-treated with dilute sodium hydroxide solution and a dispersing agent. In this way a greenish-blue dyeing is obtained which is fast to washing, sublimation and light.

If, in the above example, the 100 parts of polyester yarn are replaced by 100 parts of cellulose triacetate fabric, dyeing is performed under the conditions given and the dyeing is then rinsed with water, then a blue dyeing is obtained which is distinguished by a high degree of wet and light fastness.

Example 33

2 parts of the dyestuff obtained according to Example 30 Table VI No. 9 are finely suspended in 2000 parts of water containing 4 parts of a synthetic dispersing agent in a pressure dyeing apparatus. The pH of the dye bath is adjusted to 6.0 to 6.5 with acetic acid. 100 parts of terephthalic acid polyester fabric are introduced at 50°, the bath is heated within 30 minutes to 130° and dyeing is performed for 50 minutes at this temperature. The dyeing is rinsed, soaped and dried. A blue dyeing of pure shade is obtained which is fast to washing, light and very good sublimation.

Example 34

2 parts of the dyestuff No. 4 in Table VI (Example 31) are finely suspended in 3000 parts of water containing 6 parts of synthetic dispersing agent. 100 parts of cellulose acetate fabric are introduced at 30–40°, the temperature is raised within 30 minutes to 80° and dyeing is performed at this temperature for 50 minutes. The blue dyeing obtained is rinsed and dried. It has very good fastness to water, washing and light as well as remarkable fastness to industrial fumes, especially burnt gas fumes.

Example 35

A storable dyestuff-dispersant mixture is prepared by intimately mixing by grinding together and subsequently atomizing a mixture of (a) 1 part of the dyestuff No. 7 of Table III prepared according to Example 28, 1 to 3 parts of a synthetic dispensing agent, naphthalene sulfonic acid-formaldehyde condensation product containing the aforesaid components in a ratio of 12:1 by weight, (b) 1 part of the dyestuff No. 14 of Table VI, prepared according to Example 31, 1 to 3 parts of lignin sulfonate, sold as Artisol 2, (c) a mixture of 1 part of the dyestuff No. 9 of Table VI prepared according to Example 31, 1 part of a synthetic dispersing agent, naphthalene sulfonic acid-formaldehyde condensation product containing the aforesaid components in a ratio of 12:1 by weight, 1 part of lignin sulfonate, sold as Artisol 2.

From the above storable compositions, dye-baths for disperse dyeing of polyester fibers can be prepared by adding water and, if desired, a wetting agent.

Example 36

A storable dyestuff-dispersant mixture is prepared by intimately mixing by grinding together and subsequently atomizing a mixture of 1 part of the dyestuff of Example 28,
1 to 3 parts of lignin sulfonate, sold as Artisol 2,
0.01 to 0.5 part of dodecyl benzene sulfonate as wetting agent.

Such storage mixtures as described in Examples 35 and 36 may also be in the form of pastes containing about 1 to 3 parts of water obtained by wet grinding the aforesaid ingredients.

In a similar, storage dyestuff dispersant mixtures of equally good properties can be produced with the other dyestuffs described in Examples 1–31.

We claim:

1. A method for dyeing fibers and foils selected from the group consisting of fiber and foils of cellulose di- to tri-acetate fibers and fibers of polymerizates of alkylene glycol arylene dicarboxylic acid esters, consisting essentially of dyeing said material with an aqueous suspension of a composition-of-matter of the formula

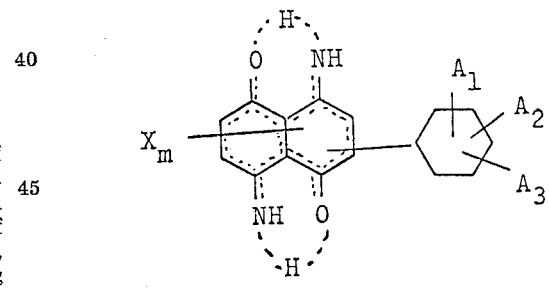

wherein $m$ is an integer ranging from 0 to 3

$A_1$ is a member selected from the group consisting of nitro, fluorinated lower alkyl, alkoxy-carbonyl of a total of from 2 to 8 carbon atoms, alkoxy-alkoxy-carbonyl of a total of from 3 to 8 carbon atoms, cyclohexyloxy-carbonyl, benzyloxy-carbonyl, lower alkyl-benzyloxy-carbonyl, chlorobenzyloxy-carbonyl, bromobenzyloxy-carbonyl, nitrobenzyloxy-carbonyl, lower alkyl-sulfonyl, N,N-di-(lower-alkyl)-sulfamyl, phenyl-carbonyl, N,N-di-(lower alkyl) - carbamyl, N - phenyl-N-lower-alkyl-carbamyl and lower alkonyl, $A_2$ is a member selected from the group consisting of hydrogen, chloro, bromo, fluoro, alkyl of 1 to 5 carbon atoms and trifluoromethyl and $A_3$ is a member selected from the group consisting of hydrogen, chloro, bromo, fluoro and alkyl of 1 to 5 carbon atoms, and X is a member selected from the group consisting of hydrogen, halogen with an atomic weight of maximally eighty.

2. A method for dyeing fibers and foils selected from the group consisting of fiber and foils of cellulose di- to tri-acetate fibers and fibers of polymerizates of alkylene glycol arylene dicarboxylic acid esters, consisting essentially of dyeing said material with an aqueous suspension of a composition-of-matter of the formula

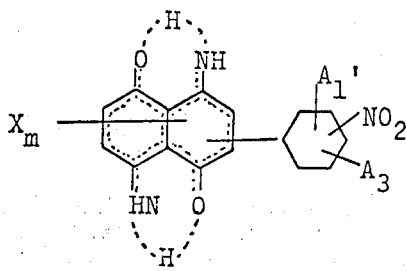

wherein $m$ is an integer ranging from 0 to 3

$A_1'$ is a member selected from the group consisting of fluorinated lower alkyl, alkoxycarbonyl of a total of from 2 to 8 carbon atoms, alkoxy-alkoxy-carbonyl of a total of from 3 to 8 carbon atoms, cyclohexyloxy-carbonyl, benzyloxy-carbonyl, lower alkyl-benzyloxycarbonyl, chlorobenzyloxy - carbonyl, bromobenzyloxy - carbonyl, nitrobenzyloxy - carbonyl, lower alkyl - sulfonyl, N,N-di-(lower alkyl)-sulfamyl, phenylcarbonyl, N,N-di-(lower alkyl)-carbamyl, N-phenyl-N-lower alkylcarbamyl and lower alkonyl, $A_3$ is a member selected from the group consisting of hydrogen, chloro, bromo, fluoro and alkyl of 1 to 5 carbon atoms, and X is a member selected from the group consisting of hydrogen, and halogen with an atomic weight of maximally eighty.

3. A method for dyeing fibers and foils slected from the group consisting of fiber and foils of cellulose di- to tri-acetate fibers and fibers of polymerizates of alkylene glycol arylene dicarboxylic acid esters, consisting essentially of dyeing said material with an aqueous suspension of a composition-of-matter of the formula

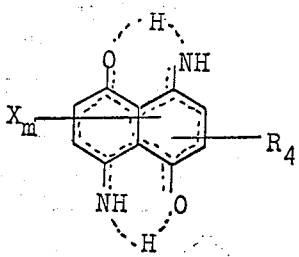

wherein $m$ is an integer ranging from 0 to 3

$R_4$ is a member selected from the group consisting of phenyl substituted with 2 to 4 chlorine, phenyl substituted with 2 to 4 fluorine, and phenyl substituted with 2 to 4 bromine atoms, X is a member selected from the group consisting of hydrogen and halogen with an atomic weight of maximally eighty.

4. A storable composition for the preparation of aqueous dispersions for the disperse dyeing of fibers and foils selected from the group consisting of fiber and foils of cellulose di- to tri-acetate fibers and fibers of polymerizates of alkylene glycol arylene dicarboxylic acid esters, consisting essentially of (a) from a minor portion up to about 50% of a composition-of-matter of the formula

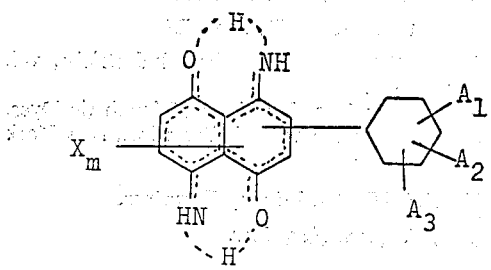

wherein $m$ is an integer ranging from 0 to 3, $A_1$ is a member selected from the group consisting of nitro, fluorinated lower alkyl, alkoxy-carbonyl of a total of from 2 to 8 carbon atoms, alkoxy-alkoxycarbonyl of a total of from 3 to 8 carbon atoms, cyclohexyloxy-carbonyl, benzyloxy-carbonyl, lower alkyl-benzyloxycarbonyl, chlorobenzyloxy-carbonyl, bromo-benzyloxy-carbonyl, nitrobenzyloxy-carbonyl, lower alkyl-sulfonyl, N,N-di-(lower alkyl)-sulfamyl, phenylcarbonyl, N,N-di-(lower alkyl)-carbamyl, N-phenyl-N-lower alkyl-carbamyl and lower alkanoyl, $A_2$ is a member selected from the group consisting of hydrogen, chloro, bromo, fluoro, alkyl of 1 to 5 carbon atoms and trifluoromethyl, $A_3$ is a member selected from the group consisting of hydrogen, chloro, bromo, fluoro and alkyl of 1 to 5 carbon atoms, and X is a member selected from the group consisting of hydrogen and halogen with an atomic weight of maxially 80;

(b) at least about 20% of a dispersing agent; and (c) about 0.1 to 10% of an anion-active wetting agent; all percentages being by weight, calculated on the total weight of the composition.

5. A composition according to claim 4, wherein the dispersant is a mixture of a substantial amount of naphthalene sulfonic acid-formaldehyde condensation product and lignin sulfonate.

6. A storable composition according to claim 4, wherein said composition-of-matter defined under (a) is of the formula

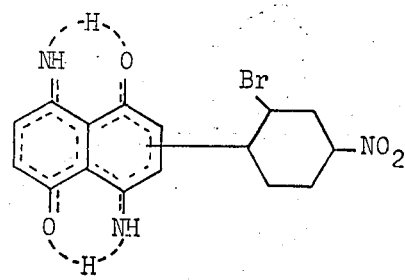

and said dispersing agent under (b) is a dispersant selected from the group consisting of naphthalene sulfonic acid-formaldehyde condensation product and lignin sulfonate and a mixture thereof.

7. A storable composition according to claim 4, and wherein said composition-of-matter defined under (a) is of the formula

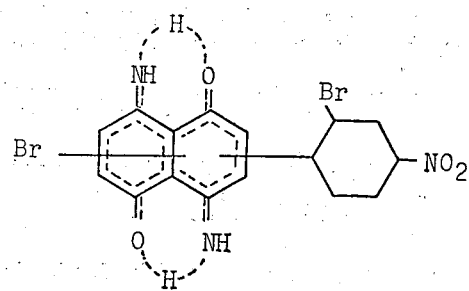

and said dispersing agent under (b) is a dispersant selected from the group consisting of naphthalene sulfonic acid-formaldehyde condensation product and lignin sulfonate and a mixture thereof.

8. A storable composition according to claim 4, wherein said composition-of-matter defined under (a) is of the formula

[Structural formula: 1,5-dihydroxy-4,8-diimino naphthalene derivative with Br substituent and a 3-chloro-4-nitrocyclohexyl group, showing intramolecular H-bonds between NH and O]

and said dispersing agent under (b) is a dispersant selected from the group consisting of naphthalene sulfonic acid-formaldehyde condensation product and lignin sulfonate and a mixture thereof.

9. A storable composition for the preparation of aqueous dispersions for the disperse dyeing of fibers and foils selected from the group consisting of fibers and foils of cellulose di- to tri-acetate fibers and fibers of polymerizates of alkylene glycol arylene dicarboxylic acid esters, consisting essentially of (a) from a minor portion up to about 50% of a composition-of-matter of the formula

[Structural formula: naphthalene-1,4,5,8-tetra(imino/oxo) system with $X_m$ substituent and cyclohexyl ring bearing $A_1'$, $NO_2$, and $A_3$ substituents]

wherein $m$ is an integer ranging from 0 to 3, $A_1'$ is a member selected from the group consisting of fluorinated lower alkyl, alkoxycarbonyl of a total of from 2 to 8 carbon atoms, alkoxy-alkoxy-carbonyl of a total of from 3 to 8 carbon atoms, cyclohexyloxy-carbonyl, benzyloxy-carbonyl, lower alkyl-benzyloxycarbonyl, chlorobenzyloxy-carbonyl, bromobenzyloxy-carbonyl, nitrobenzyloxy-carbonyl, lower alkyl-sulfonyl, N,N-di-(lower alkyl)-sulfamyl, phenyl-carbonyl, N,N-di-(lower alkyl)-carbamyl, N-phenyl-N-lower alkyl-carbamyl and lower alkanoyl, $A_3$ is a member selected from the group consisting of hydrogen, chloro, bromo, fluoro and alkyl of 1 to 5 carbon atoms, and X is a member selected from the group consisting of hydrogen and halogen with an atomic weight of maximally eighty, (b) at least about 20% of a dispersing agent; and (c) about 0.1 to 10% of an anion-active wetting agent; all percentages being by weight calculated on the total weight of the composition.

10. A composition according to claim 9, wherein the wetting agent is a hydrophilic higher alkylbenzene sulfonate, wherein alkyl is of about 10 to 18 carbon atoms.

11. A storable composition according to claim 9, wherein said composition-of-matter defined under (a) is of the formula

[Structural formula: naphthalene tetra(imino/oxo) system with cyclohexyl group bearing $NO_2$ and $COOCH_2$-$CH_2$-$CH_2$-$CH_3$ substituents]

and said dispersing agent under (b) is a dispersant selected from the group consisting of naphthalene sulfonic acid-formaldehyde condensation product and lignin sulfonate and a mixture thereof.

12. A storable composition for the preparation of aqueous dispersions for the disperse dyeing of fibers and foils selected from the group consisting of fiber and foils of cellulose di- to tri-acetate fibers and fibers of polymerizates of alkylene glycol arylene dicarboxylic acid esters, consisting essentially of (a) from a minor portion up to about 50% of a composition-of-matter of the formula

[Structural formula: naphthalene tetra(imino/oxo) system with $X_m$ and $R_4$ substituents]

wherein $m$ is an integer ranging from 0 to 3, $R_4$ is a member selected from the group consisting of phenyl substituted with 2 to 4 chlorine, phenyl substituted with 2 to 4 fluorine, and phenyl substituted with 2 to 4 bromine atoms, X is a member selected from the group consisting of hydrogen and halogen with an atomic weight of maximally 80;

(b) at least about 20% of a dispersing agent; and (c) about 0.1 to 10% of an anion-active wetting agent; all percentages being by weight, calculated on the total weight of the composition.

13. A storable composition according to claim 12, wherein said composition-of-matter is of the formula

[Structural formula: naphthalene tetra(imino/oxo) system with Br substituent and trichlorocyclohexyl group]

and said dispersing agent under (b) is a dispersant selected from the group consisting of naphthalene sulfonic acid-formaldehyde condensation product and lignin sulfonate and a mixture thereof.

References Cited

UNITED STATES PATENTS 2,211,126   8/1940   Kern ---------------- 8—34

OTHER REFERENCES

E. Merian: 31E Congress DeChimie Industrielle, vol. 2, 1958, pp. 523–531.

K. Venkataraman: The Chemistry of Synthetic Dyes, vol. 1, pp. 421–428, Pub. Academic Press Inc., New York City.

NORMAN G. TORCHIN, *Primary Examiner.*

J. HERBERT, *Assistant Examiner.*